United States Patent [19]
Weir

[11] 3,850,545
[45] Nov. 26, 1974

[54] FLEX FAN
[75] Inventor: Thomas J. Weir, Indianapolis, Ind.
[73] Assignee: Hayes-Albion Corporation, Jackson, Mich.
[22] Filed: Sept. 7, 1972
[21] Appl. No.: 286,895

[52] U.S. Cl................ 416/132, 416/210, 416/226, 416/240
[51] Int. Cl............................................ F04d 29/38
[58] Field of Search............. 416/240, 132, 210, 23, 416/226

[56] References Cited
UNITED STATES PATENTS

| | | | |
|---|---|---|---|
| 1,250,681 | 12/1917 | Sheldon | 416/227 |
| 1,347,003 | 7/1920 | Baumann et al. | 416/226 |
| 2,032,224 | 2/1936 | Paton | 416/132 |
| 2,323,165 | 6/1943 | Thomas | 416/226 |
| 2,406,499 | 8/1946 | Jandasek | 416/132 |
| 2,774,308 | 12/1956 | Ulander et al. | 416/23 |
| 3,042,371 | 7/1962 | Fanti | 416/226 X |
| 3,044,557 | 7/1962 | Posh | 416/132 A |
| 3,664,165 | 5/1972 | Harvill et al. | 416/132 UX |
| 3,711,219 | 1/1973 | Strick | 416/132 |
| 3,773,435 | 11/1973 | Wooden | 416/132 |

FOREIGN PATENTS OR APPLICATIONS

| | | | |
|---|---|---|---|
| 411,904 | 4/1910 | France | 416/132 A |
| 961,742 | 4/1957 | Germany | 416/226 |
| 856,668 | 12/1960 | Great Britain | 416/23 |
| 138,077 | 1/1903 | Germany | 416/23 |
| 12,717 | 0/1889 | Great Britain | 416/132 |

Primary Examiner—Everette A. Powell, Jr.
Attorney, Agent, or Firm—John L. Cline

[57] ABSTRACT

Flexible fan blades which decamber with increasing speed of the fan are mounted to a casting. The hub and spider arms are defined by the casting. The spider arms are thick and aerodynamically shaped to reduce the tendency of the fan to stall. The arms support the blade along its entire length to prevent lateral vibrations.

2 Claims, 3 Drawing Figures

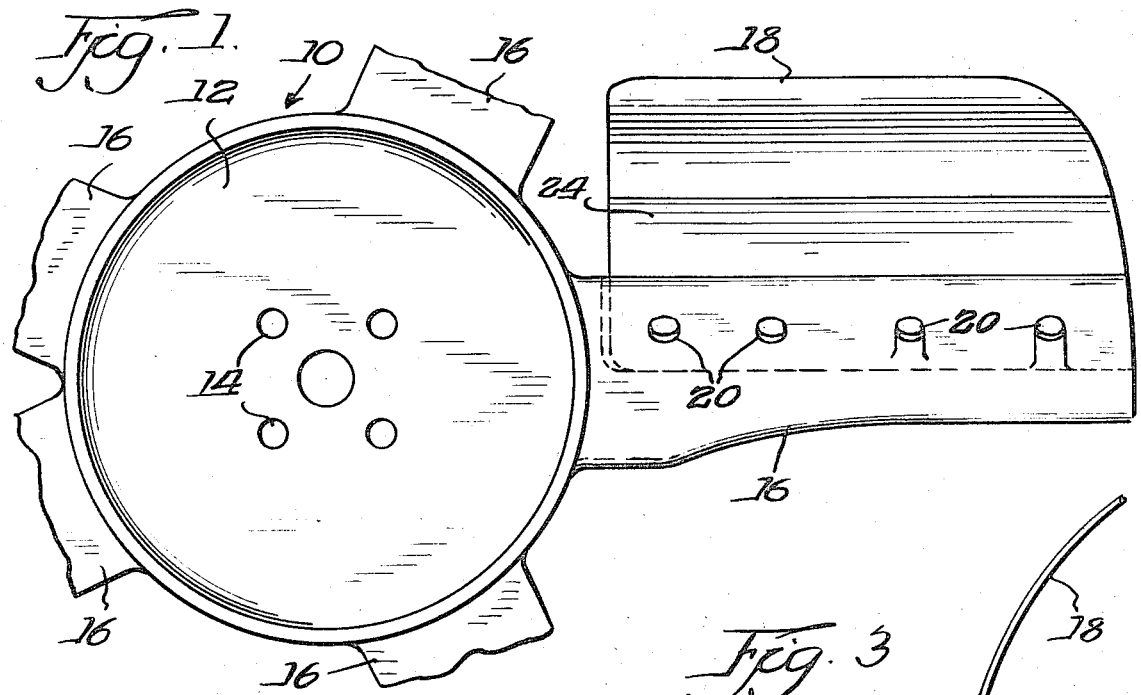
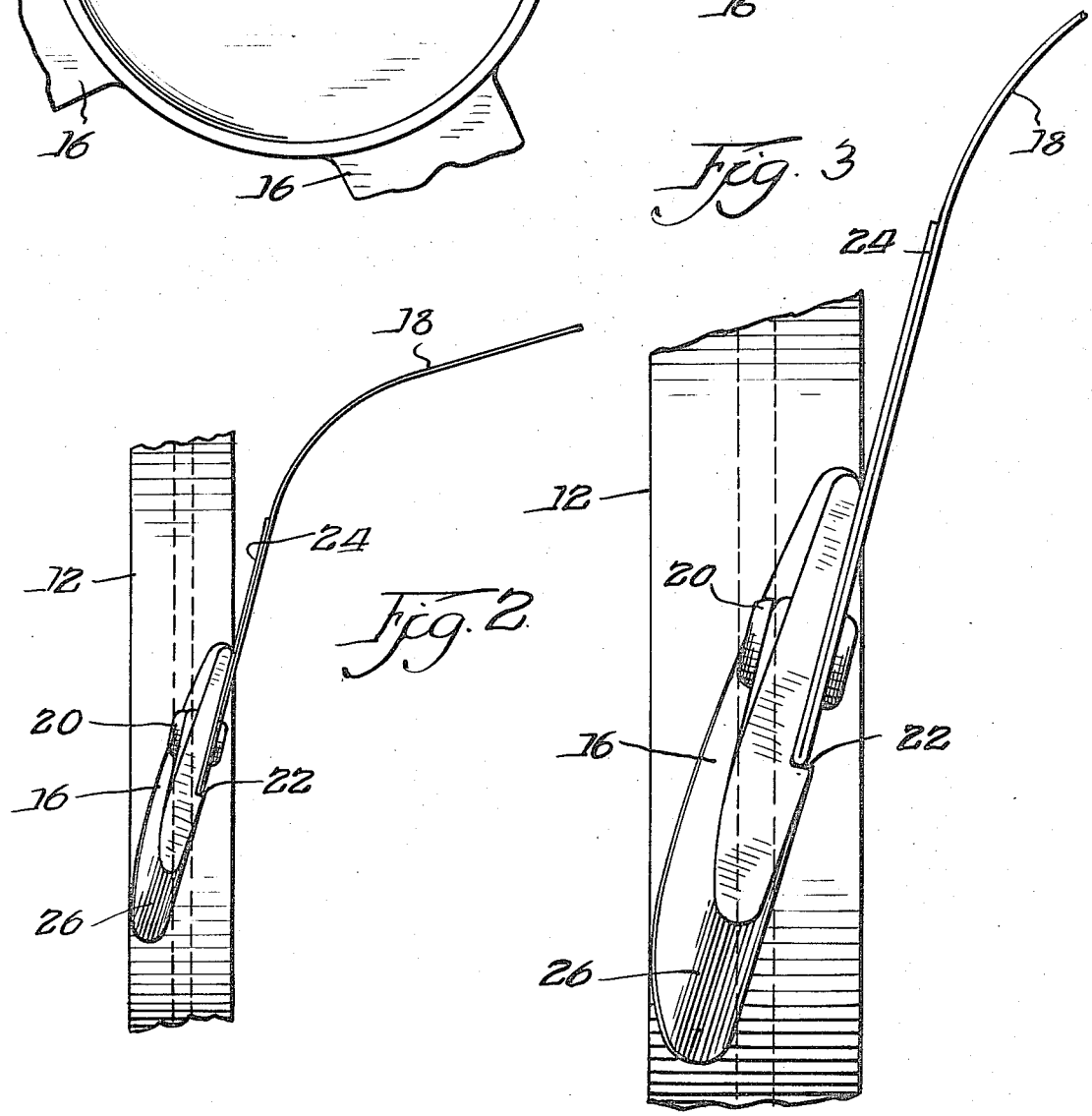

FLEX FAN

BACKGROUND OF THE INVENTION

This invention relates to automotive fans and in particular to automotive fans having flexible blades.

Automotive fans having flexible blades are commonly known as flex fans. The blades are designed to decamber or lose their pitch as the speed of the vehicle increases. This is done to minimize the noise produced by the fan and to reduce the power necessary to operate the fan.

Generally, flex fans have their spider arms or leading edges canted at an angle to the plane of rotation of the fan. When the attack angle of the leading edge of the fan approaches an aerodynamic stall condition with respect to the air flowing past the fan, the fan becomes noisy and this noise is highly undesirable. In many applications the attack angle must be positioned very close to the stall angle and consequently noise may develop from this condition.

Another factor which contributes to fan noise is vibration of the flexible fan blade. Many flexible fan blades are not supported along their entire length and consequently can vibrate laterally. This vibration is another source of undesirable noise.

In general, flex fans are fabricated from a plurality of parts. It is necessary to form a sub-assembly of the blade, backing member, and in some instances other items before final assembly to the spider arms. The multiplicity of parts leads to an expensive fan, both because of the materials involved and the cost of assembly.

SUMMARY OF THE INVENTION

The fan presented in this invention includes an integral hub and cast spider arms. The spider arms are thick, aerodynamically shaped, and form the leading edges of the fan. The shape of the spider arms increases the fan's tolerance to stalling conditions and thus provides a quieter fan.

Another aspect of this invention is the provision of a spider arm along the entire length of the fan. By fully supporting the fan blade its resistance to lateral vibration is increased and noise from such vibration is virtually eliminated.

The flexible fan blade used in this invention may be assembled directly to the spider arm without the need for sub-assembly operations. Thus, expense of manufacture is significantly reduced.

Because the hub and spider arms are formed from the casting lightweight materials may be used. The hub and spider arms may be formed from lightweight materials such as aluminum and its alloys or even plastic in some applications, thus reducing the overall weight of the fan.

BRIEF DESCRIPTION OF THE DRAWINGS

The features of this invention will become more apparent in the following detailed description of a preferred embodiment read in conjunction with the Figures in which:

FIG. 1 is a plan view of a fan constructed in accordance with the principles of this invention. FIG. 2. is an end view of the blade depicted in FIG. 1.

FIG. 3 is an enlarged view of a portion of FIG. 2.

DETAILED DESCRIPTION OF A PREFERRED EMBODIMENT

Referring to the Figures wherein like reference numerals indicate like parts a flex fan is indicated generally by the reference numeral 10. The fan 10 includes a hub 12 which has mounting holes 14 to secure the fan to the vehicle. The spider arms 16 are disposed about the perimeter of the hub 12 and may be asymmetrically spaced as depicted in FIG. 1.

A flexible fan blade 18 is secured to each of the spider arms 16 by a plurality of rivets 20. The blade fits into a recess 22 which is formed on the back of the spider arm 16. The recess 22 extends for the full length of the arm and the full length of the blade 18.

A portion of the blade 24 serves as a stiffening strip. The stiffening strip 24 is formed by merely folding a blade material back on itself as shown most clearly in FIG. 3.

The hub 12 and the spider arms 16 are preferably formed by a casting operation. Preferably they are die cast from aluminum although other casting methods and other materials may be used. Since it is desirable to form the hub and spider arms from lightweight materials, zinc and plastic would also be preferred materials.

The spider arms 16 are twisted with respect to the plane of the hub 12. They are formed in a thick, wing like or aerodynamic configuration as may be seen in the end view shown in FIG. 2 and FIG. 3. The leading edge of the spider arm 26 is also shown in FIGS. 2 and 3. By forming the spider arms 16 in an aerodynamically stable configuration and of a relatively thick cross section, the tendency of the fan to stall condition is greatly reduced.

The spider arms 16 support their respective blades 18 along the entire length as shown in FIG. 1. By so supporting the blades 18 noise which could result from lateral vibration of the blade 18 is eliminated.

Although the flexible blade 18 has been illustrated in conjunction with a backing strip 24, it is obvious that the backing strip 24 is not necessary in all application.

The fan of this invention is a hallmark of simplicity to manufacture. There are only three parts to assembly, the hub and spider casting, the blade, and the rivets. This eliminates the need for sub-assemblies and reduces the cost of manufacturing the fan.

What is claimed is:

1. An automotive fan comprising:
    a one-piece cast member including a hub and a plurality of spider arms projecting radially from said hub;
    said spider arms being skewed to the plane of said hub and having a rounded thickened leading edge and curved front and rear faces merging into said leading edge such that said spider arms are aerodynamically shaped to decrease the sensitivity of said fan to stalling and including a L-shaped recess in one face of each of said arms for receiving flexible fan blades;
    a curved one-piece flexible fan blade, having a free end, attached to each of said spider arms in said recess such that the leading edges of said fan are defined entirely by said spider arms, the outer face of said blade is substantially aligned with the recessed face of said spider arm and said blades abut said spider arms along the entire length of said blades.

2. The automotive fan set forth in claim 1 wherein said hub and arm member are formed from an aluminum alloy.

* * * * *